United States Patent [19]

Jain

[11] 4,252,410

[45] Feb. 24, 1981

[54] POLARIZATION ROTATION METHOD AND APPARATUS

[75] Inventor: Kantilal Jain, Santa Clara, Calif.

[73] Assignee: Hewlett-Packard Company, Palo Alto, Calif.

[21] Appl. No.: 952,745

[22] Filed: Oct. 19, 1978

[51] Int. Cl.³ .......................... G02F 1/01; G02B 27/28
[52] U.S. Cl. ...................................... 350/370; 350/394
[58] Field of Search .................... 350/152, 147, 286

[56] References Cited

PUBLICATIONS

Klein, A. G., "Novel Prism for Use in Scanning Systems", Applied Optics, vol. 12, 3-1973, pp. 616-617.
Keilmann, F., "How to Flip the Polarization of Infrared Laser Beams", Optics Comm., vol. 14, 6-1975, pp. 236-237.
Chraplyvy, A. R., "Polarization Flipper for Infrared Beams", Applied Optics, vol. 15, 1976, pp. 2022-2023.
Klein, A. G., "Polarization Flipper for Infrared Laser Beams: Comment", Applied Optics, 6-1977, p. 1489.

*Primary Examiner*—John K. Corbin
*Assistant Examiner*—Wm. H. Punter
*Attorney, Agent, or Firm*—Allston L. Jones; Edward Y. Wong

[57] ABSTRACT

A method and apparatus for rotating through a selected angle the polarization vector of a substantially linearly polarized electromagnetic beam by using three or four reflections with the output electromagnetic beam being substantially free of ellipticity. By selecting the second and third angles of incidence such that the ellipticity introduced by the second reflection is cancelled by the third reflection and the first and fourth angles of incidence which introduce substantially no ellipticity, the polarization vector of the incident electromagnetic beam need not be restricted to being parallel or perpendicular to the incident plane.

26 Claims, 2 Drawing Figures

POLARIZATION ROTATION METHOD AND APPARATUS

BACKGROUND OF THE INVENTION

A polarization rotator is a device that rotates the polarization vector (E-vector) of an electromagnetic wave through a selected angle. The rotation of the E-vector, usually by 90°, is a frequent requirement in numerous applications, especially those using a laser.

In the visible region of the spectrum, retardation plates are often used to produce the desired rotation. However, in the infrared portion of the spectrum, retardation plates are of limited value since the known birefringent materials having a high threshold for laser damage are not easily obtainable. Moreover, retardation plates produce the desired rotation only at a single wavelength.

To overcome the problems inherent in retardation plates in the infrared range, the seven and five reflection polarization rotators of the prior art were developed. The seven reflection polarization rotator was introduced by F. Keilmann in an article in *Optics Communications*, Vol. 14, p. 236 (1974) entitled *How To Flip The Polarization Of Infrared Laser Beams*, and the five reflection polarization flipper was introduced by A. R. Chraplyvy in an article in *Applied Optics*, Vol. 15, p. 2022 (1976) entitled *Polarization Flipper For Infrared Laser Beams*.

Each of the polarization rotators of the prior art requires that the E-vector of the electromagnetic wave remain either perpendicular or parallel to the plane defined by the incident and reflected electromagnetic waves to and from that surface. The seven reflection polarization rotator of the prior art also limits every reflection angle to 45°.

These limitations on the prior art polarization rotators have been selected to prevent the introduction of ellipticity at any point in the electromagnetic wave. Thus, the prior art devices must be properly oriented relative to the incident wave E-vector in order to have a 90° rotation of the output polarization. If the incident orientation includes a deviation of x, there will be a 2x error in the rotation angle, in addition to the introduction of ellipticity in the output polarization.

It would be advantageous to have a polarization rotator that uses fewer than five reflections to increase the throughput and to simplify the construction of the device. It would be a greater advantage if the E-vector of the incident electromagnetic wave were not constrained to being either perpendicular or parallel to the plane defined by the incident and reflected electromagnetic waves to and from the first reflective surface. By removing the perpendicular or parallel orientation restraint, the device would permit the rotation of the E-vector through the desired angle regardless of its orientation to the incident wave. The present invention represents such a polarization rotator.

SUMMARY OF THE INVENTION

In accordance with the illustrated embodiment, the present invention provides a polarization rotator including three or four reflective surfaces which overcome the limitations of the prior art rotators discussed above. With the present invention, the polarization vector of an incident substantially linearly polarized electromagnetic beam can be rotated through a selected angle with the output beam being substantially free of ellipticity.

To accomplish this, without requiring that the polarization vector of the incident beam be either perpendicular or parallel to the incident plane, the incident beam is reflected through a first selected angle of incidence with the resultant first reflected beam being substantially free of ellipticity. This first reflected beam is next reflected through a second selected angle of incidence and the resulting second reflected beam is then reflected through a third selected angle of incidence with the second and third angles being selected such that the ellipticity introduced at the second reflection is substantially cancelled at the third reflection. The resultant third reflected beam is thus substantially free of ellipticity.

One way to achieve the ellipticity cancellation discussed above is to orient the second and third reflective surfaces such that the plane defined by the first and second reflected beams is substantially perpendicular to the plane defined by the second and third reflected beams, in addition to the second reflective surface being oriented such that the plane defined by the first and second reflected beams forms an enclosed angle of substantially 135° with the plane defined by the incident and the first reflected beam, i.e., the incident plane.

In the three reflection configuration where the third reflected beam is the output beam, the second and third reflective surfaces are oriented such that the third reflected beam is coplanar with the incident beam.

By adding a fourth reflective surface that is oriented to reflect the third reflected beam through a fourth selected angle of incidence, a fourth reflected beam is produced that is substantially free from ellipticity. With the addition of the fourth surface, it is possible to orient the output beam, i.e., the fourth reflected beam, so that it is either coplanar or colinear with the incident beam.

DESCRIPTION OF THE PREFERRED EMBODIMENT

Figure 1:
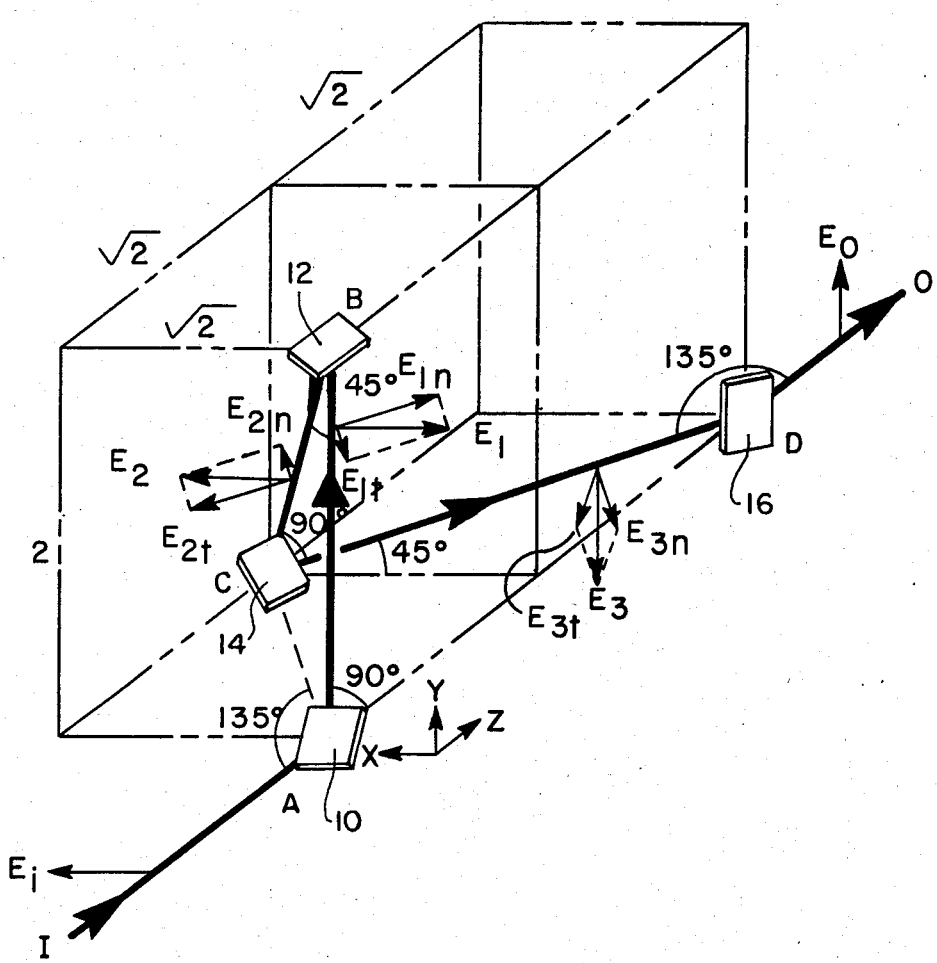
FIG. 1 represents the electromagnetic wave path through a polarization rotator of the present invention with the locations of the reflective surfaces at A, B, C, and D being selected to provide a 90° clockwise rotation between the E-vectors of the input and output waves.

The polarization rotator of the present invention geometrically manipulates the E-vector of the incident electromagnetic wave through the selected rotational angle by reflections from three or four surfaces 10, 12, 14, and 16. Through the proper selection of the coordinates of each of the reflection vertices and the reflection angles, any selected rotation of the E-vector of the input wave can be obtained, using either three or four reflections. Additionally, by the proper selection of the geometry of the device and the placement of the reflective surfaces, a polarization converter can be constructed wherein the linear polarization of a beam can be converted to an elliptic/circular polarization or vice versa.

To perform polarization rotation by means of three or four reflective surfaces, the input beam must be substantially linearly polarized, and the reflective surfaces so placed that any ellipticity introduced by third reflective surface 14 substantially cancels the ellipticity introduced by second reflective surface 12, with the ellipticity introduced at first reflective surface 10 and fourth reflective surface 16 being kept to a minimum. These guidelines serve to assure that the output beam is substantially linearly polarized with the E-vector rotated by the desired angle from the E-vector of the input beam.

In FIG. 1 there is shown one orientation of the three or four reflection vertices at points A, B, and C, or A, B, C, and D, respectively. With these configurations of the reflection vertices, the polarization vector, $E_i$, of the input linearly polarized beam is rotated clockwise by 270° or 90° forming the $E_3$-vector or the $E_0$-vector, respectively, in the output beam. When three reflective surfaces 10, 12, and 14 are used, the output beam, CD, is coplanar with the input beam, IA. By adding fourth reflective surface 16 at D, the output beam, DO, is made colinear with the input beam, IA.

While the $E_i$-vector of the input beam is shown in FIG. 1 as being perpendicular to the plane IAB for ease of visualizing the operation of the device, this is not a necessary restriction on the orientation of the $E_i$-vector. To achieve proper operation of the present device it is only necessary that the input beam be linearly polarized, i.e., that the $E_i$-vector be perpendicular to the input beam depicted by the line IA.

To further help visualize the orientation and placement of the reflection vertices for the desired 270° or 90° rotation of $E_i$, a dimensioned rectangular block (dimensional in any selected units) is shown enclosing those vertices. As defined by the dimensions on this block, the angles of incidence at each of the reflection vertices are as follows: $A_i$ 45°; $B_i$ 22.5°; $C_i$ 45°; and $D_i$ 67.5° with reflective surface 16 at D being omitted in the three reflection case. On each segment of the beam, the orientation of its E-vector is shown based on the initial orientation of $E_i$ for this configuration of the reflective vertices. Additionally, the normal and tangential components of vectors $E_1$ and $E_2$ are shown. These normal and tangential components are defined with respect to the surfaces ABC and BCD, respectively.

In the above discussion we have assumed that each of reflective surfaces 10, 12, 14 and 16 were of a material having infinite conductivity. However, when real materials are used, ellipticity is introduced at any reflective surface where the incident E-vector is neither parallel nor perpendicular to the plane of incidence (i.e., the plane formed by the incident and reflected beams). Thus, in FIG. 1 where $E_i$ is perpendicular to the incident plane IAB and $E_3$ is perpendicular to the incident plane CDO, the reflections at A and D are free of ellipticity, whereas the reflections at B and C are not. However, since the planes ABC and BCD are mutually perpendicular, the tangential component, $E_{1t}$ (the normal component, $E_{1n}$) for the reflection at B becomes the normal component, $E_{2n}$ (the tangential component, $E_{2t}$) for the reflection at C; hence the ellipticities introduced at B and C substantially cancel each other. This cancelling effect would be complete if the angles of incidence at B and C were equal. Since these angles are 22.5° and 45° respectively in the embodiment shown in FIG. 1, a small amount of ellipticity remains in the E-vector of the output beam, DC or DO.

Tracing the E-vectors through each of the reflections in FIG. 1, it can be seen when starting with the $E_i$-vector in the positive x direction that the $E_1$-vector will be in the negative x direction after reflection at A. Since plane ABC is at 135° with plane IAB, it can be seen that:

$$E_{1t} = E_{1n} = E_1/\sqrt{2} \qquad (1)$$

where $E_1$ represents the magnitude of the $E_1$ vector
$E_{1n}$ is the magnitude of the normal component of $E_1$ to the plane ABC
$E_{1t}$ is the magnitude of the tangential component of $E_1$ to the plane ABC.

After reflection at B, since planes ABC and BCD are perpendicular, $$E_{2t} = E_{1n}^\gamma = \gamma_{Bn} E_{1n} = \gamma_{Bn} E_1/\sqrt{2} \qquad (2a)$$

and $$E_{2n} = E_{1t}^\gamma = \gamma_{Bt} E_{1t} = \gamma_{Bt} E_1/\sqrt{2} \qquad (2b)$$

where $\gamma_{Bn}$ is the reflection coefficient at B to the incident normal component of the polarization vector $E_1$
$\gamma_{Bt}$ is the reflection coefficient at B to the incident tangential component of the polarization vector $E_1$
$E_{1n}^\gamma$ and $E_{1t}^\gamma$ are the magnitudes of $E_{1n}$ and $E_{1t}$ respectively, after reflection at B.

Note: Each of the reflection coefficients are assumed to contain all of the errors present from whatever source.

After the next reflection at C, we get $$E_{2n}^\gamma = \gamma_{Cn} \gamma_{Bt} E_1/\sqrt{2} \qquad (3a)$$

and $$E_{2t}^\gamma = \gamma_{Ct} \gamma_{Bn} E_1/\sqrt{2} \qquad (3b)$$

where
$\gamma_{Cn}$ and $\gamma_{Ct}$ are defined similarly to $\gamma_{Bn}$ and $\gamma_{Bt}$ at C
$E_{2n}^\gamma$ and $E_{2t}^\gamma$ have similar definitions to $E_{1n}^\gamma$ and $E_{1t}^\gamma$ after reflection at C.

Hence, since planes BCD and CDO are at 45° to each other, the normal and tangential components of $E_3$ to plane CDO can be expressed as follows:

$$E_{3n} = (\gamma_{Cn} \gamma_{Bt} + \gamma_{Ct} \gamma_{Bn}) E_1/2 \qquad (4a)$$

$$E_{3t} = (\gamma_{Cn} \gamma_{Bt} - \gamma_{Ct} \gamma_{Bn}) E_1/2 \qquad (4b)$$

If a high conductivity reflective surface, such as aluminum, is used for each of the reflective surfaces, each of the reflective coefficients will be very close to unity, thus:

$$\gamma_{Cn} \gamma_{Bt} \approx \gamma_{Ct} \gamma_{Bn} \qquad (5)$$

and $$E_{3n} \approx E_1 \text{ and } E_{3t} \approx 0 \qquad (6)$$

therefore, $$E_3 \approx E_{3n} \approx E_1 \text{ since } E_{3n} >> E_{3t} \qquad (7)$$

with $E_{3n}$ being rotated clockwise through 270° from $E_i$. Finally, $$E_{on} \approx \gamma_{Dn}(\gamma_{Cn} \gamma_{Bt} + \gamma_{Ct} \gamma_{Bn}) E_1/2 \qquad (8a)$$

$$E_{ot} \approx \gamma_{Dt}(\gamma_{Cn} \gamma_{Bt} - \gamma_{Ct} \gamma_{Bn}) E_1/2 \qquad (8b)$$

yielding $$E_o \approx E_1 \text{ since } E_{on} >> E_{ot} \qquad (9)$$

where $E_o$ is rotated clockwise by 90° from $E_i$.

The ellipticity of $E_o$ can be calculated from equations 8a and 8b. Using the American Institute of Physics Handbook standard ($n-ik=28-i70$) for aluminum mirrors with an incident infrared beam having a wavelength of 10.6 $\mu$m, the ellipticity, E, equals 0.0065 which is sufficiently low for most applications. In the visible light range, however, $E_{ot}$ becomes appreciable and a significant amount of ellipticity will be experienced. For example, for light with a 6328 A wavelength, $n-ik=1.21-i7$ yielding an ellipticity of $E=0.05$.

Through experimentation, by using a He-Ne laser (visible light) with a polarization ratio of greater than 1000:1 and a calcite polarizer with an extinction coefficient greater than 40 dB to produce an input beam with a polarization ratio of greater than $10^7$:1 resulted in an output beam having an ellipticity of $E=0.06$. From the calculation results presented in the last paragraph, it can be seen that with an incident beam having a wavelength in the 10 $\mu$m region, the ellipticity will be an order of magnitude smaller.

Figure 2:
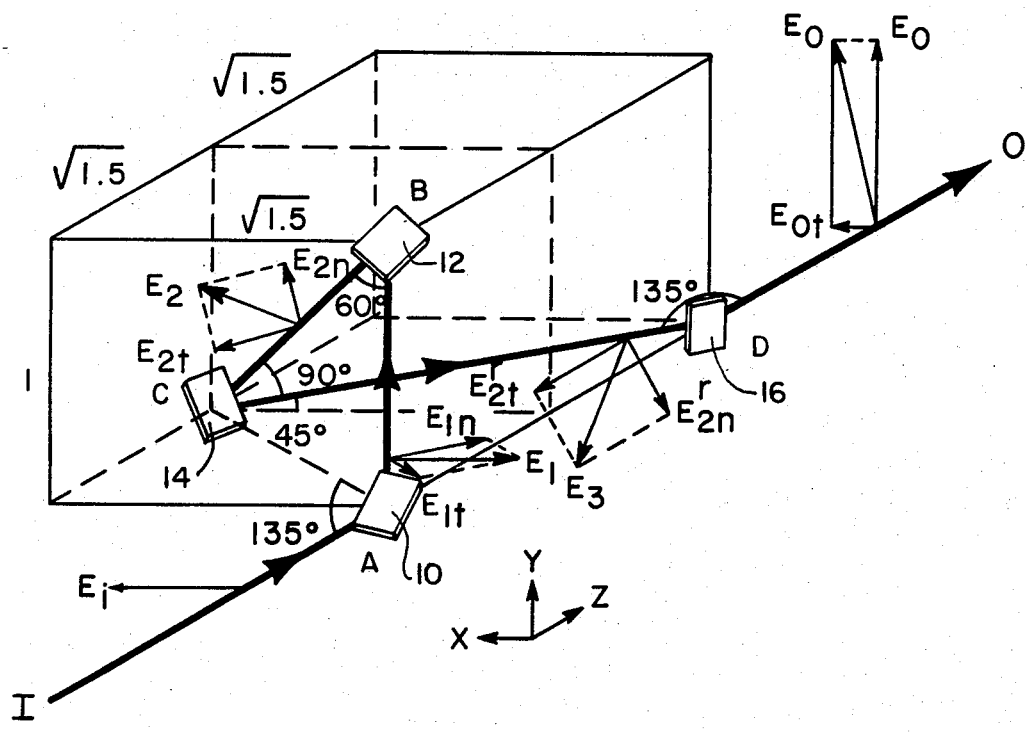
FIG. 2 represents the electromagnetic wave path through a polarization rotator of the present invention with the locations of the reflective surfaces at A, B, C, and D being selected to provide a 75° clockwise rotation between the E-vectors of the input and output waves.

A second orientation of the three or four reflection vertices at points A, B, and C, or A, B, C, and D is shown in FIG. 2. This orientation provides a 285° or 75° clockwise rotation between the input and output polarization vectors, $E_i$ and $E_3$ or $E_0$, respectively.

To obtain the 285° or 75° of rotation between $E_i$ and $E_3$ or $E_0$, the reflection vertices are located at the points shown in FIG. 2 in a rectangular block outline that is dimensioned as shown (any selected units). As defined by the dimensions on this block, the angles of incidence at each of the reflection vertices are as follows: $A_i$ 45°; $B_i$ 30°; $C_i$ 45°; and $D_i$ 67.5° with the reflection surface at D omitted in the three reflection configuration.

Tracing the E-vectors through each of the reflections in FIG. 2 as we did for FIG. 1 above, it can again be seen that when the $E_i$-vector is in the positive x direction that the $E_1$ vector will be in the negative x direction after reflection at A. Then, for the reasons as stated above with equation (1):

$$E_{1t} = E_{1n} = E_1/\sqrt{2} \quad (10)$$

Then, after reflection at B, we have $$E_{2t} = E_{1n}{}^\gamma = \gamma B_n 1n = \gamma B_n E_1/\sqrt{2} \quad (11a)$$

and $$E_{2n} = E_{1t}{}^\gamma = \gamma B_t E_{1t} = \gamma B_t E_1/\sqrt{2} \quad (11b)$$

After the next reflection at C, we get, as in equations (3a) and (3b), $$E_{2n}{}^\gamma = \gamma C_n \gamma B_t E_1/\sqrt{2} \quad (12a)$$

$$E_{2t}{}^\gamma = \gamma C_t \gamma B_{n\,i} E_1/\sqrt{2} \quad (12b)$$

Now, with reference to plane CDO, the normal and tangential components of $E_3$ are $$E_{3n} = E_{2n}^\gamma \cos 30° + E_{2t}^\gamma \cos 60° \quad (13a)$$

$$= (\sqrt{3}\ \gamma C_n \gamma B_t + \gamma C_t \gamma B_n) E_1/\sqrt{8}$$

and $$E_{3t} = E_{2t}^\gamma \cos 30° - E_{2n}^\gamma \cos 60° \quad (13b)$$

$$= (\sqrt{3}\ \gamma C_t \gamma B_n - \gamma C_n \gamma B_t) E_1/\sqrt{8}$$

6 Note that $E_3$ is the output polarization direction.

When the reflection at D is employed to make the output beam colinear with the input beam, the normal and tangential components of $E_o$ are given by $$E_{on} = E_{3n}{}^\gamma = \gamma D_n(\sqrt{3}\gamma C_n \gamma B_t = \gamma C_t \gamma B_n) E_1/\sqrt{8} \quad (14a)$$

and $$E_{ot} = E_{3t}{}^\gamma = \gamma D_t(\sqrt{3}\gamma C_t \gamma B_n - \gamma C_n \gamma B_t) E_1/\sqrt{8} \quad (14b)$$

The ellipticity can be calculated as before. At 10.6$\mu$ with aluminum mirrors, we find that the ellipticity produced in the output beam in the 3-mirror case is 0.0052 and that in the 4-mirror case 0.0085.

I claim:

1. A method of rotating the polarization vector of a substantially linearly polarized incident electromagnetic beam through a selected angle with the introduction of substantially no ellipticity in the output electromagnetic beam, the sequential method comprising the steps of:

reflecting the incident electromagnetic beam through a first selected angle of incidence for producing a first reflected beam that is substantially free of ellipticity;

reflecting the first reflected beam through a second selected angle of incidence for producing a second reflected beam; and reflecting the second reflected beam through a third selected angle of incidence for producing a third reflected beam, said second and third angles of incidence being selected to cause the ellipticity introduced by the third reflection to substantially cancel the ellipticity introduced by the second reflection so that the third reflected beam is substantially free of ellipticity.

2. The method of claim 1 wherein:

the second and third angles of incidence are selected to cause the plane defined by said first and second reflected beams to be substantially perpendicular to the plane defined by said second and third reflected beams; and the orientation of the second angle of incidence is selected such that the plane defined by the first and second reflected beams forms an enclosed angle of substantially 135° with the plane defined by the incident and the first reflected beams.

3. The method of claim 2 wherein said second and third angles of incidence are selected to cause the third reflected beam to be coplanar with the incident beam, and said third reflected beam is the output beam.

4. The method of claim 3 wherein:

the first angle of incidence is selected to be substantially equal to 45°; and second selected angle of incidence is substantially 22.5° to produce in the output a substantially 270° clockwise rotation of the polarization vector from that of the incident beam.

5. The method of claim 3 wherein:

the first angle of incidence is selected to be substantially equal to 45°; and second selected angle of incidence is substantially 30° to produce in the output a substantially 285° clockwise rotation of the polarization vector from that of the incident beam.

6. The method of claim 1 further including the next sequential step of reflecting the third reflected beam through a fourth selected angle of incidence for producing a fourth reflected beam that is substantially free from ellipticity.

7. The method of claim 6 wherein:
the second and third angles of incidence are selected to cause the plane defined by said first and second reflected beam to be substantially perpendicular to the plane defined by said second and third reflected beams; and
the orientation of the second angle of incidence is selected such that the plane defined by the first and second reflected beams forms an enclosed angle of substantially 135° with the plane defined by the incident beam and the first reflected beam.

8. The method of claim 7 wherein the fourth selected angle is selected to cause the fourth reflected beam to be coplanar with the incident beam, and said fourth reflected beam is the output beam.

9. The method of claim 8 wherein:
the first angle of incidence is selected to be substantially equal to 45°; and
the fourth angle of incidence is selected to be substantially equal to 67.5°.

10. The method of claim 7 wherein the second, third and fourth selected angles of incidence are selected to cause the fourth reflected beam to be colinear with the incident beam, and said fourth reflected beam is the output beam.

11. The method of claim 7 wherein:
the first angle of incidence is selected to be substantially equal to 45°; and
the fourth angle of incidence is selected to be substantially equal to 67.5°.

12. The method of claim 9 or 11 wherein said second selected angle of incidence is substantially 22.5° to produce in the output beam a substantially 90° clockwise rotation of the polarization vector from that of the incident beam.

13. The method of claim 9 or 11 wherein said second selected angle of incidence is substantially 30° to produce in the output beam a substantially 75° clockwise rotation of the polarization vector from that of the incident beam.

14. An apparatus for rotating the polarization vector of a substantially linearly polarized incident electromagnetic beam through a selected angle with the introduction of substantially no ellipticity in the output electromagnetic beam comprising:
first means for reflecting the incident electromagnetic beam through a first selected angle of incidence to produce a first reflected beam that is substantially free of ellipticity;
second means for reflecting the first reflected beam from the first means through a second selected angle of incidence to produce a second reflected beam; and
third means for reflecting the second reflected beam from the second means through a third selected angle of incidence to produce a third reflected beam, said second and third angles of incidence being selected to cause the ellipticity introduced by the third reflection to substantially cancel the ellipticity introduced by the second reflection so that the third reflected beam is substantially free of ellipticity.

15. The apparatus of claim 14 wherein:
the second and third means are oriented such that the plane defined by said first and second reflected beams is substantially perpendicular to the plane defined by said second and third reflected beams; and
the second means is oriented such that the plane defined by the first and second reflected beams forms an enclosed angle of substantially 135° with the plane defined by the incident and the first reflected beams.

16. The apparatus of claim 15 wherein said second and third means are oriented such that the third reflected beam is coplanar with the incident beam, and said third reflected beam is the output beam.

17. The apparatus of claim 16 wherein:
the first means is oriented such that the first angle of incidence is substantially equal to 45°; and
the second means is oriented such that the second angle of incidence is substantially 22.5° to produce in the output a substantially 270° clockwise rotation of the polarization vector from that of the incident beam.

18. The apparatus of claim 16 wherein:
the first means is oriented such that the first angle of incidence is substantially equal to 45°; and
the second means is oriented such that the second angle of incidence is substantially 30° to produce in the output a substantially 285° clockwise rotation of the polarization vector from that of the incident beam.

19. The apparatus of claim 14 further including:
fourth means for reflecting the third reflected beam from the third means through a fourth selected angle of incidence to produce a fourth reflected beam that is substantially free from ellipticity.

20. The apparatus of claim 19 wherein:
the second and third means are oriented such that the plane defined by said first and second reflected beam is substantially perpendicular to the plane defined by said second and third reflected beams; and
the second means is oriented such that the plane defined by the first and second reflected beams forms an enclosed angle of substantially 135° with the plane defined by the incident beam and the first reflected beam.

21. The apparatus of claim 20 wherein the fourth means is oriented such that the fourth reflected beam is coplanar with the incident beam, and said fourth reflected beam is the output beam.

22. The apparatus of claim 21 wherein:
the first means is oriented such that the first angle of incidence is substantially equal to 45°; and
the fourth means is oriented such that the fourth angle of incidence is substantially equal to 67.5°.

23. The apparatus of claim 20 wherein the second, third and fourth means are oriented such that the fourth reflected beam is colinear with the incident beam, and said fourth reflected beam is the output beam.

24. The apparatus of claim 20 wherein:
the first means is oriented such that the first angle of incidence is substantially equal to 45°; and
the fourth means is oriented such that the fourth angle of incidence is substantially equal to 67.5°.

25. The apparatus of claim 22 or 24 wherein said second means is oriented such that the second angle of incidence is substantially 22.5° to produce in the output beam a substantially 90° clockwise rotation of the polarization vector from that of the incident beam.

26. The apparatus of claim 22 or 24 wherein said second means is oriented such that the second angle of incidence is substantially 30° to produce in the output beam a substantially 75° clockwise rotation of the polarization vector from that of the incident beam.

* * * * *

UNITED STATES PATENT AND TRADEMARK OFFICE
CERTIFICATE OF CORRECTION

PATENT NO. : 4,252,410
DATED : February 24, 1981
INVENTOR(S) : Kantilal Jain

It is certified that error appears in the above-identified patent and that said Letters Patent are hereby corrected as shown below:

Column 4, equations (2a) and (2b) should read $$E_{2t} = E_{1n}^{\gamma} = \gamma_{B_n} E_{1n} = \gamma_{B_n} E_1/\sqrt{2} \qquad (2a)$$

$$E_{2n} = E_{1t}^{\gamma} = \gamma_{B_t} E_{1t} = \gamma_{B_t} E_1/\sqrt{2} \qquad (2b)$$

Column 4, line 21 delete "$\gamma_{Bn}$" and insert -- $\gamma_{B_n}$ --

Column 4, line 23, delete "$\gamma_{Bt}$" and insert -- $\gamma_{B_t}$ --

Column 4, equations (3a) and (3b) should read $$E_{2n}^{\gamma} = \gamma_{C_n} \gamma_{B_t} E_1/\sqrt{2} \qquad (3a)$$

$$E_{2t}^{\gamma} = \gamma_{C_t} \gamma_{B_n} E_1/\sqrt{2} \qquad (3b)$$

Column 4, line 34, delete "$\gamma C_n$ and $\gamma C_t$" and insert -- $\gamma_{C_n}$ and $\gamma_{C_t}$ --

Column 4, line 34 delete "$\gamma B_n$ and $\gamma B_t$" and insert -- $\gamma_{B_n}$ and $\gamma_{B_t}$ --

UNITED STATES PATENT AND TRADEMARK OFFICE
CERTIFICATE OF CORRECTION

PATENT NO. : 4,252,410
DATED : February 24, 1981
INVENTOR(S) : Kantilal Jain

It is certified that error appears in the above-identified patent and that said Letters Patent are hereby corrected as shown below:

Column 4, equations (4a) and (4b) should read $$E_{3n} = (\gamma_{C_n} \gamma_{B_t} + \gamma_{C_t} \gamma_{B_n}) E_1/2 \tag{4a}$$

$$E_{3t} = (\gamma_{C_n} \gamma_{B_t} - \gamma_{C_t} \gamma_{B_n}) E_1/2 \tag{4b}$$

Column 4, equation 5 should read $$\gamma_{C_n} \gamma_{B_t} \simeq \gamma_{C_t} \gamma_{B_n} \tag{5}$$

Column 4, equations (8a) and (8b) should read $$E_{on} \simeq \gamma_{D_n} (\gamma_{C_n} \gamma_{B_t} + \gamma_{C_t} \gamma_{B_n}) E_1/2 \tag{8a}$$

$$E_{ot} \simeq \gamma_{D_t} (\gamma_{C_n} \gamma_{B_t} - \gamma_{C_t} \gamma_{B_n}) E_1/2 \tag{8b}$$

Column 5, line 9, "6328A" should read --6328Å--

Column 5, equations (11a) and (11b) should read $$E_{2t} = E_{1n}^{\gamma} = \gamma_{B_n} E_{1n} = \gamma_{B_n} E_1/\sqrt{2} \tag{11a}$$

$$E_{2n} = E_{1t}^{\gamma} = \gamma_{B_t} E_{1t} = \gamma_{B_t} E_1/\sqrt{2} \tag{11b}$$

Column 5, equation (12a) should read $$E_{2n}^{\gamma} = \gamma_{C_n} \gamma_{B_t} E_1/\sqrt{2} \tag{12a}$$

UNITED STATES PATENT AND TRADEMARK OFFICE
CERTIFICATE OF CORRECTION

PATENT NO. : 4,252,410

DATED : February 24, 1981

INVENTOR(S) : Kantilal Jain

It is certified that error appears in the above-identified patent and that said Letters Patent are hereby corrected as shown below:

Column 5, equation (12b) should read $$E^{\gamma}_{2t} = \gamma_{C_t} \gamma_{B_n} E_1 / \sqrt{2} \qquad (12b)$$

Column 5, that portion of equation (13a) reading
"$= (\sqrt{3} \, \gamma_{C_n} \gamma_{B_t} + \gamma_{C_t} \gamma_{B_n}) E_1/\sqrt{8}$" should read $$-- = (\sqrt{3} \, \gamma_{C_n} \gamma_{B_t} + \gamma_{C_t} \gamma_{B_n}) E_1/\sqrt{8} \, --$$

Column 5, that portion of equation (13b) reading
"$= (\sqrt{3} \, \gamma_{C_t} \gamma_{B_n} - \gamma_{C_n} \gamma_{B_t}) E_1/\sqrt{8}$" should read $$-- = (\sqrt{3} \, \gamma_{C_t} \gamma_{B_n} - \gamma_{C_n} \gamma_{B_t}) E_1/\sqrt{8} \, --$$

Column 6, equations (14a) and (14b) should read $$E_{on} = E^{\gamma}_{3n} = \gamma_{D_n} (\sqrt{3} \, \gamma_{C_n} \gamma_{B_t} + \gamma_{C_t} \gamma_{B_n}) E_1/\sqrt{8} \qquad (14a)$$

UNITED STATES PATENT AND TRADEMARK OFFICE
CERTIFICATE OF CORRECTION

PATENT NO. : 4,252,410
DATED : February 24, 1981
INVENTOR(S) : Kantilal Jain

It is certified that error appears in the above-identified patent and that said Letters Patent are hereby corrected as shown below:

$$E_{ot} = E_{3t}^{\gamma} = \gamma_{D_t} (\sqrt{3} \; \gamma_{C_t} \gamma_{B_n} - \gamma_{C_n} \gamma_{B_t}) E_1/\sqrt{8} \qquad (14b)$$

Signed and Sealed this

Twenty-ninth Day of September 1981

[SEAL]

Attest:

GERALD J. MOSSINGHOFF

Attesting Officer

Commissioner of Patents and Trademarks